(12) United States Patent
Ziegler

(10) Patent No.: US 11,383,941 B2
(45) Date of Patent: Jul. 12, 2022

(54) METHOD AND SYSTEM FOR ARRANGING ARTICLES

(71) Applicant: Graphic Packaging International, LLC, Atlanta, GA (US)

(72) Inventor: Kelly W. Ziegler, Crosby, MN (US)

(73) Assignee: Graphic Packaging International, LLC, Atlanta, GA (US)

( * ) Notice: Subject to any disclaimer, the term of this patent is extended or adjusted under 35 U.S.C. 154(b) by 0 days.

(21) Appl. No.: 17/075,038

(22) Filed: Oct. 20, 2020

(65) Prior Publication Data
US 2021/0114825 A1  Apr. 22, 2021

Related U.S. Application Data

(60) Provisional application No. 62/923,903, filed on Oct. 21, 2019.

(51) Int. Cl.
*B65G 57/11* (2006.01)
*B65G 21/20* (2006.01)
*B65G 57/03* (2006.01)

(52) U.S. Cl.
CPC .......... *B65G 57/11* (2013.01); *B65G 21/2063* (2013.01); *B65G 57/03* (2013.01); *B65G 2201/02* (2013.01)

(58) Field of Classification Search
CPC ............................. B65G 57/11; B65G 57/03
USPC ...................................................... 414/790.7
See application file for complete search history.

(56) References Cited

U.S. PATENT DOCUMENTS

| 3,978,571 | A | * | 9/1976 | Orlando | H01M 10/14 |
|  |  |  |  |  | 29/730 |
| 5,340,100 | A |  | 8/1994 | Romanenko |  |
| 5,456,058 | A |  | 10/1995 | Ziegler |  |
| 5,711,137 | A |  | 1/1998 | Moncrief et al. |  |
| 5,775,067 | A |  | 7/1998 | Hawley |  |
| 6,189,678 | B1 | * | 2/2001 | Loewenthal | B65B 59/001 |
|  |  |  |  |  | 198/418.3 |
| 2007/0240381 | A1 |  | 10/2007 | Alfonso et al. |  |

FOREIGN PATENT DOCUMENTS

KR  10-2002-0088497 A  11/2002

OTHER PUBLICATIONS

International Search Report and Written Opinion for PCT/US2020/056457 dated Jan. 27, 2021.

* cited by examiner

*Primary Examiner* — Lynn E Schwenning
(74) *Attorney, Agent, or Firm* — Womble Bond Dickinson (US) LLP

(57) ABSTRACT

A method of arranging articles can comprise moving a first article and a second article along a respective first lane and second lane toward a respective first output end of the first lane and second output end of the second lane, and guiding the first article from the first output end onto a stacking conveyor. The guiding the first article can comprise engaging the first article with first guide features. The method further can comprise moving the first article on the stacking conveyor past the second output end, and forming a stack by guiding the second article from the second output end onto the first article on the stacking conveyor as the stacking conveyor moves the first article past the second output end. The guiding the second article can comprise engaging the second article with second guide features. The method also can comprise moving the stack on the stacking conveyor.

19 Claims, 14 Drawing Sheets

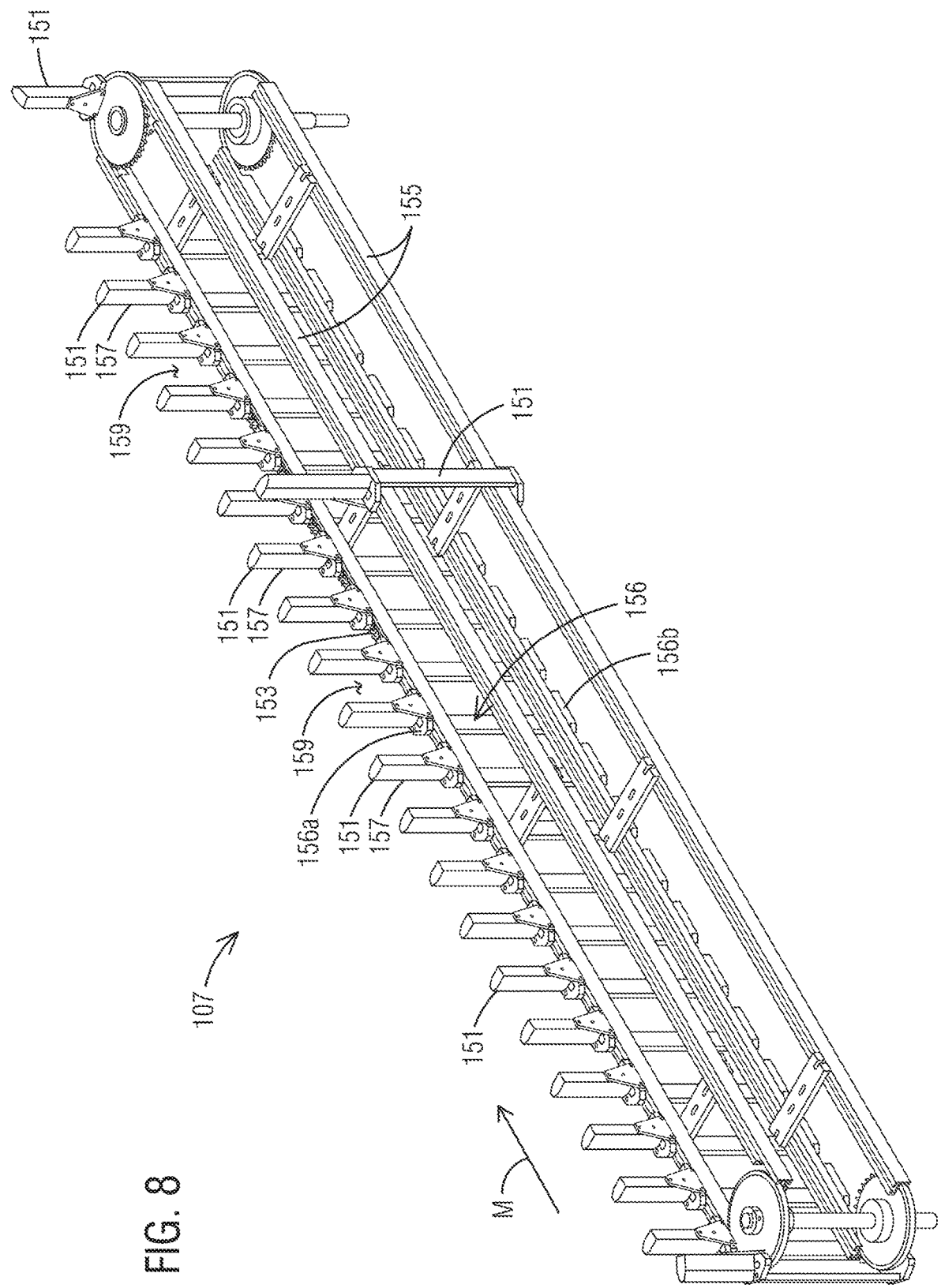

METHOD AND SYSTEM FOR ARRANGING ARTICLES

CROSS-REFERENCE TO RELATED APPLICATIONS

This application claims the benefit of U.S. Provisional Patent Application No. 62/923,903, filed on Oct. 21, 2019.

INCORPORATION BY REFERENCE

The disclosure of U.S. Provisional Patent Application No. 62/923,903, filed on Oct. 21, 2019, is hereby incorporated by reference for all purposes as if presented herein in its entirety.

BACKGROUND OF THE DISCLOSURE

The present disclosure generally relates to systems and methods for arranging articles and systems and methods for loading the articles into cartons. More specifically, the present disclosure is directed to methods and systems for arranging the articles in a stacked configuration and for loading the stacks in cartons.

SUMMARY OF THE DISCLOSURE

In general, one aspect of the disclosure is directed to a method of arranging articles. The method can comprise moving a first article and a second article along a respective first lane and second lane toward a respective first output end of the first lane and second output end of the second lane, and guiding the first article from the first output end of the first lane onto a stacking conveyor. The guiding the first article can comprise engaging the first article with first guide features. The method further can comprise moving the first article on the stacking conveyor past the second output end of the second lane, and forming a stack by guiding the second article from the second output end of the second lane onto the first article on the stacking conveyor as the stacking conveyor moves the first article past the second output end. The guiding the second article can comprise engaging the second article with second guide features. The method also can comprise moving the stack on the stacking conveyor.

In another aspect, the disclosure is generally directed to a system for arranging articles. The system can comprise an article conveyor moving a first article in a first lane and a second article in a second lane. The first lane can comprise a first output end with first guide features and the second lane can comprise a second output end with second guide features. A stacking conveyor can extend along the article conveyor and can move past the first output end of the first lane and the second output end of the second lane. The first guide features can guide the first article onto the stacking conveyor at the first output end of the first lane and the second guide features can guide the second article onto the first article at the second output end of the second lane.

In another aspect, the disclosure is generally directed to a receiving apparatus mounted to an outer frame. The receiving apparatus can comprise a height adjustment apparatus mounted to the outer frame and a movable frame suspended from the height adjustment apparatus. The movable frame can support conveyor features for receiving and moving articles in the receiving apparatus. The height adjustment apparatus can be operable to move the movable frame vertically relative to the outer frame.

In another aspect, the disclosure is generally directed to a method that can comprise obtaining a receiving apparatus mounted to an outer frame. The receiving apparatus can comprise a height adjustment apparatus mounted to the outer frame and a movable frame suspended from the height adjustment apparatus. The movable frame can support conveyor features for receiving and moving articles in the receiving apparatus. The method further can comprise operating the height adjustment apparatus to move the movable frame vertically relative to the outer frame.

Additional aspects, features, and advantages of the present invention will become apparent from the following description and accompanying figures.

BRIEF DESCRIPTION OF THE DRAWINGS

Those skilled in the art will appreciate the above stated advantages and other advantages and benefits of various additional embodiments reading the following detailed description of the embodiments with reference to the below-listed drawing figures. It is within the scope of the present disclosure that the above-discussed aspects be provided both individually and in various combinations.

According to common practice, the various features of the drawings discussed below are not necessarily drawn to scale. Dimensions of various features and elements in the drawings may be expanded or reduced to more clearly illustrate the embodiments of the disclosure.

FIG. 8 is a schematic perspective view of a flight assembly of the system of FIG. 1 according to the exemplary embodiment of the disclosure.

Corresponding parts are designated by corresponding reference numbers throughout the drawings.

DETAILED DESCRIPTION OF THE EXEMPLARY EMBODIMENTS

The present disclosure generally relates to a system and method of arranging articles and a system and method of adjusting an article loading system. The systems according to the present disclosure can accommodate articles of any shape. The articles can be containers, bowls, trays, cups, etc. The articles can be used for packaging food and beverage products, for example. The articles can be made from materials suitable in composition for packaging the particular food or beverage items, and the materials include, but are not limited to, paperboard and/or other paper products; paperboard laminates; plastics such as PET, LDPE, LLDPE, HDPE, PP, PS, PVC, EVOH, and Nylon; aluminum and/or other metals; glass; and the like, or any combination thereof.

Figure 1:
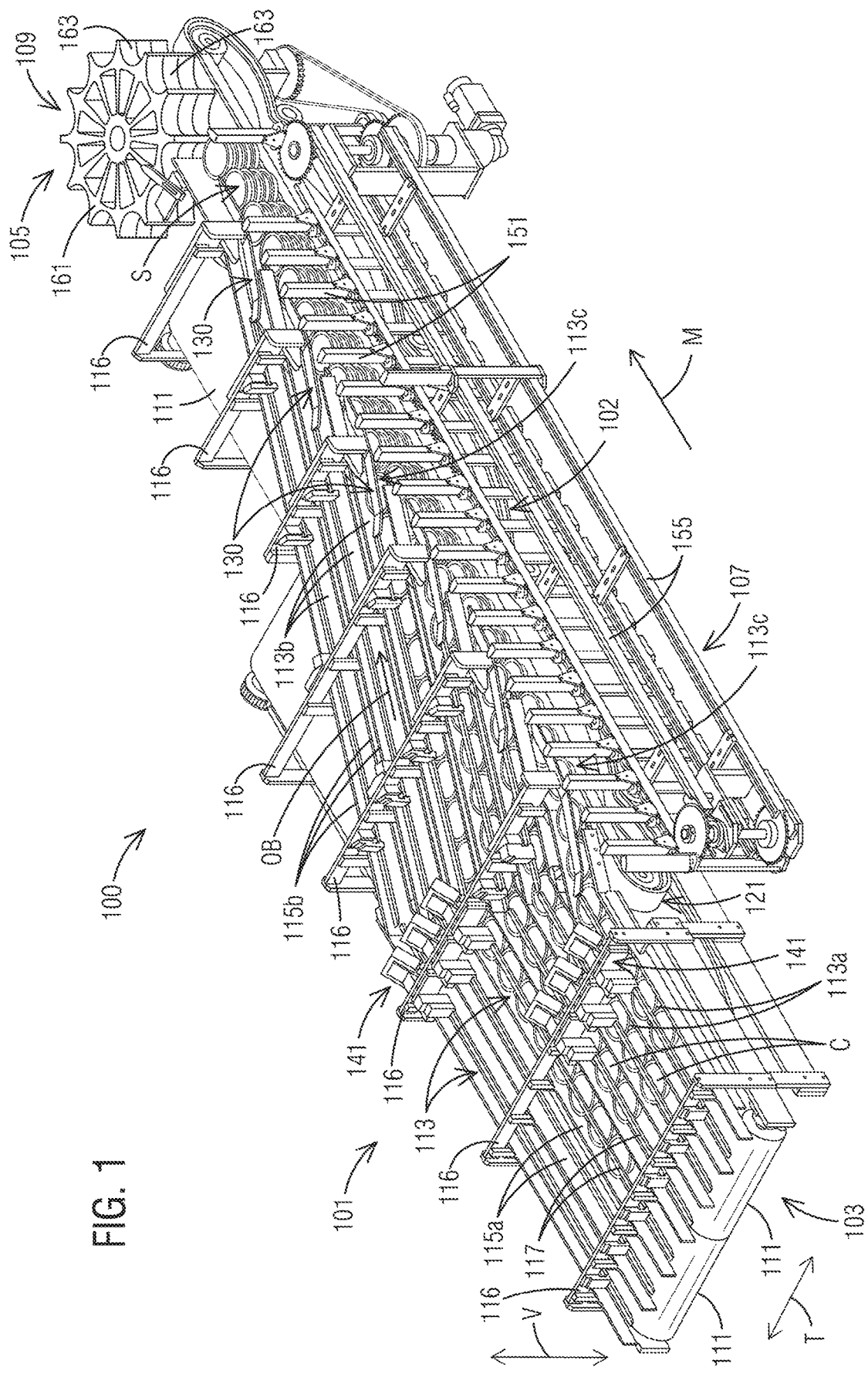
FIG. 1 is a schematic perspective view of a system for arranging articles according to an exemplary embodiment of the disclosure.

FIG. 1 generally illustrates an example embodiment of a system and method 100 for arranging articles or containers C in accordance with the disclosure. In exemplary embodiments, the arranged articles can be stored and/or can be transferred to another station for further processing. For example, the arranged articles can be packaged manually or by an at least partially automated system. Packaging the arranged articles can include wrapping the arranged articles (e.g., with a paperboard wrap, a plastic film, etc.), loading the arranged articles into cartons or other containers, and/or other suitable packaging configurations. In addition, FIG. 11 generally illustrates an example embodiment of at least a portion of a system and method 300 for loading the articles or containers C into cartons (not shown) in accordance with the disclosure. In an exemplary embodiment, loading the articles C into cartons can include wrapping the cartons around the articles C. In one embodiment, the systems 100, 300 can be included in a continuous packaging machine for packaging the articles C for storage, shipping, and/or sale. For example, the packaging machine can continuously or substantially continuously feed articles C to the system 100, which arranges the articles C as described below, and then transfers the arranged articles C to the system 300, wherein the carton and the articles form a package. Alternatively, the systems 100 and/or 300 can be indexed, conveying the articles C in steps.

Figure 2A:
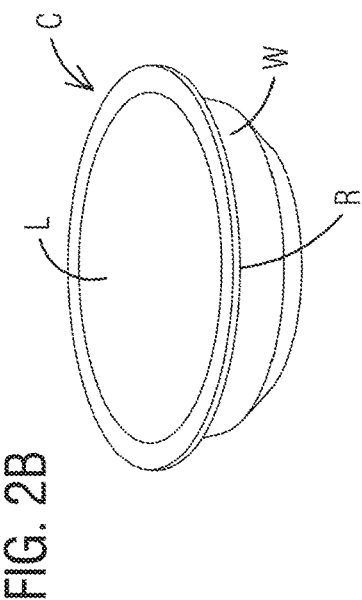
FIG. 2A is a schematic side view of an article for being arranged and loaded in the system of FIG. 1 according to the exemplary embodiment of the disclosure.
Figure 2B:
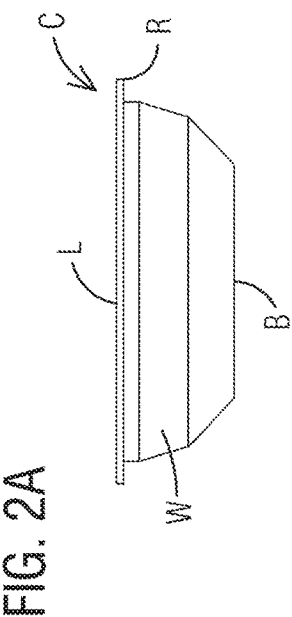
FIG. 2B is a schematic perspective view of the article of FIG. 2A.

In the illustrated embodiment, the containers C can be in the form of bowls, trays, tubs, cups, or other suitable articles. As shown in FIGS. 2A and 2B, each article C can have a sidewall W extending around a bottom B so that the sidewall W and the bottom B at least partially form an interior (not shown) of the article C. A flange or rim R can extend outwardly from an upper edge of the sidewall W, and a lid L (e.g., a foil, a polymer film, or other suitable lid) can seal the top of the article C along an upper surface of the rim R. The articles C could be otherwise shaped, positioned, arranged, and/or configured without departing from the disclosure.

Figure 3:
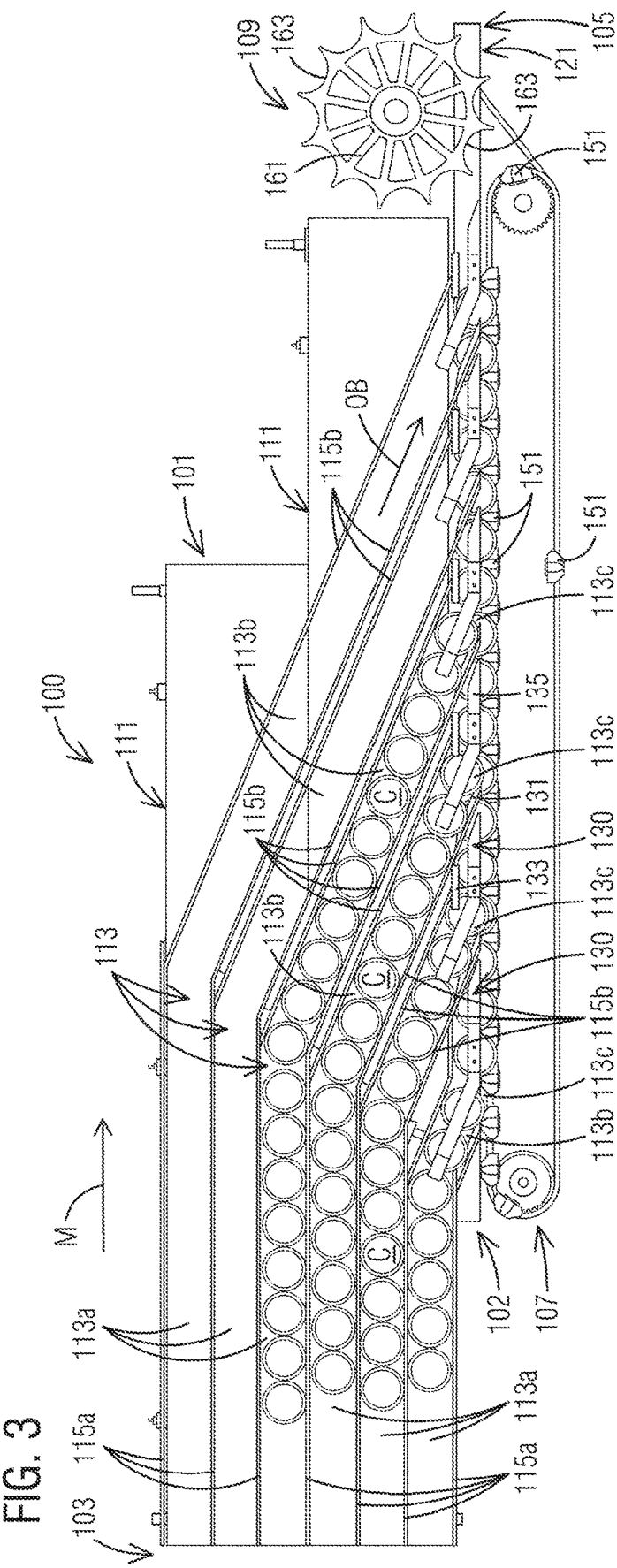
FIG. 3 is a top view of the system of FIG. 1.

As shown in FIGS. 1 and 3, the packaging system 100 moves the articles C in an article conveyer assembly 101 onto a stacking conveyor assembly 102 while moving the articles C from an upstream end 103 to a downstream end 105 generally in a machine direction M (e.g., the downstream direction). In an exemplary embodiment, the system 100 can include a vertical direction V and a lateral or transverse direction T that are each perpendicular (e.g., transverse) to the machine direction M (FIG. 1). In the illustrated embodiment, the articles C can be arranged in stacks S as they move from the article conveyor assembly 101 onto a sloped stacking conveyor 121 of the stacking conveyor assembly 102. A flight assembly 107 can help guide the articles C as they move in the machine direction M on the stacking conveyor assembly 102 and can help form the stacks S and maintain the articles C in the stacks S. Subsequently, a star wheel assembly 109 can engage each stack S at the downstream end 105 and move the respective stacks S off of the stacking conveyor assembly 102 to an output conveyor, to another system for further processing (e.g., packaging), and/or to any suitable features. For example, the stacks S can be moved by the star wheel assembly 109 to the system 300 (e.g., directly or via a conveyor, not shown).

As shown in FIGS. 1 and 3, the article conveyor assembly 101 can include two article conveyors 111 (e.g., motor-driven endless conveyors) moving the articles C along a number of lanes 113. Alternatively, the article conveyor assembly 101 could include one article conveyor 111 or any suitable number article conveyors 111. In the illustrated embodiment, the lanes 113 can be defined by several upstream product guides 115a that can guide the articles C along upstream portions 113a of the lanes 113 and several downstream product guides 115b that can guide the articles C along downstream portions 113b of the lanes 113. As shown in FIG. 1, the product guides 115a, 115b can be mounted over the article conveyors 111 on cross bars 116, which can be supported above the article conveyors 111 and the product guides 115a, 115b by a frame or other support elements of the system. As shown in FIGS. 1 and 3, each of the upstream product guides 115a extends along the machine direction M so that the upstream portions 113a of the lanes 113 also extend along the machine direction M. As shown in FIGS. 1 and 3, the downstream product guides 115b can extend from the upstream product guides 115a at an angle with respect to the machine direction M and the upstream product guides 115a. Accordingly, the downstream portions 113b of the lanes 113 extend in an oblique direction OB from the upstream portion 113a of the respective lane 113 toward the stacking conveyor 121 that extends along the article conveyor 111. In the illustrated embodiment, each of the lanes 113 can have an output end 113c at a transition edge 119 (FIG. 6) of the article conveyor 111 adjacent the stacking conveyor 121.

In the illustrated embodiment, the upstream portions 113a of the lanes 113 can be adjacent one another (e.g., so that two adjacent lanes 113 share one of the upstream product guides 115a). As shown in FIGS. 1 and 3, the angled downstream portions 113b of the lanes 113 can be spaced from one another and two spaced-apart downstream product guides 115b can extend from each upstream product guide 115a to define the spaced apart downstream portions 113b. In one embodiment, the article conveyor 111 that is farthest from the stacking conveyor assembly 102 can be shorter in the machine direction than the other article conveyor 111 due to the angle of the downstream portions 113b of the lanes 113. As shown in FIG. 3, the lane 113 that is closest to the stacking conveyor 121 can be the first to transition from the upstream portion 113a to the downstream portion 113b with each subsequent lane 113 transitioning to the downstream portion 113b at a point that is downstream from the transition of the prior lane 113 as the spacing of the upstream portions 113 of the lanes 113 from the transition edge 119 of the article conveyor 111 increases. Accordingly, the output ends 113c of the respective lanes 113 can be evenly spaced along the transition edge 119 of the article conveyor 111.

As shown in FIG. 1, a hold down rail or top rail 117 (FIG. 1) can be mounted to the cross bars 116 along each lane 113. In one embodiment, the top rails 117 can extend over the articles C along the lanes 113 to help prevent the articles C from moving vertically as they move on the article conveyors 111. In the illustrated embodiment, the article conveyor assembly 101 can include six lanes 113 (with seven upstream product guides 115a and twelve downstream product guides 115b) with any number of the lanes 113 being used. Any of the article conveyors 111, the lanes 113, the product guides 115a, 115b, the cross bars 116, and/or the top rails 117 could be omitted or could be otherwise shaped, positioned, arranged, and/or configured without departing from the disclosure. For example, any suitable number of lanes 113 and product guides 115a, 115b could be included.

Figure 5:
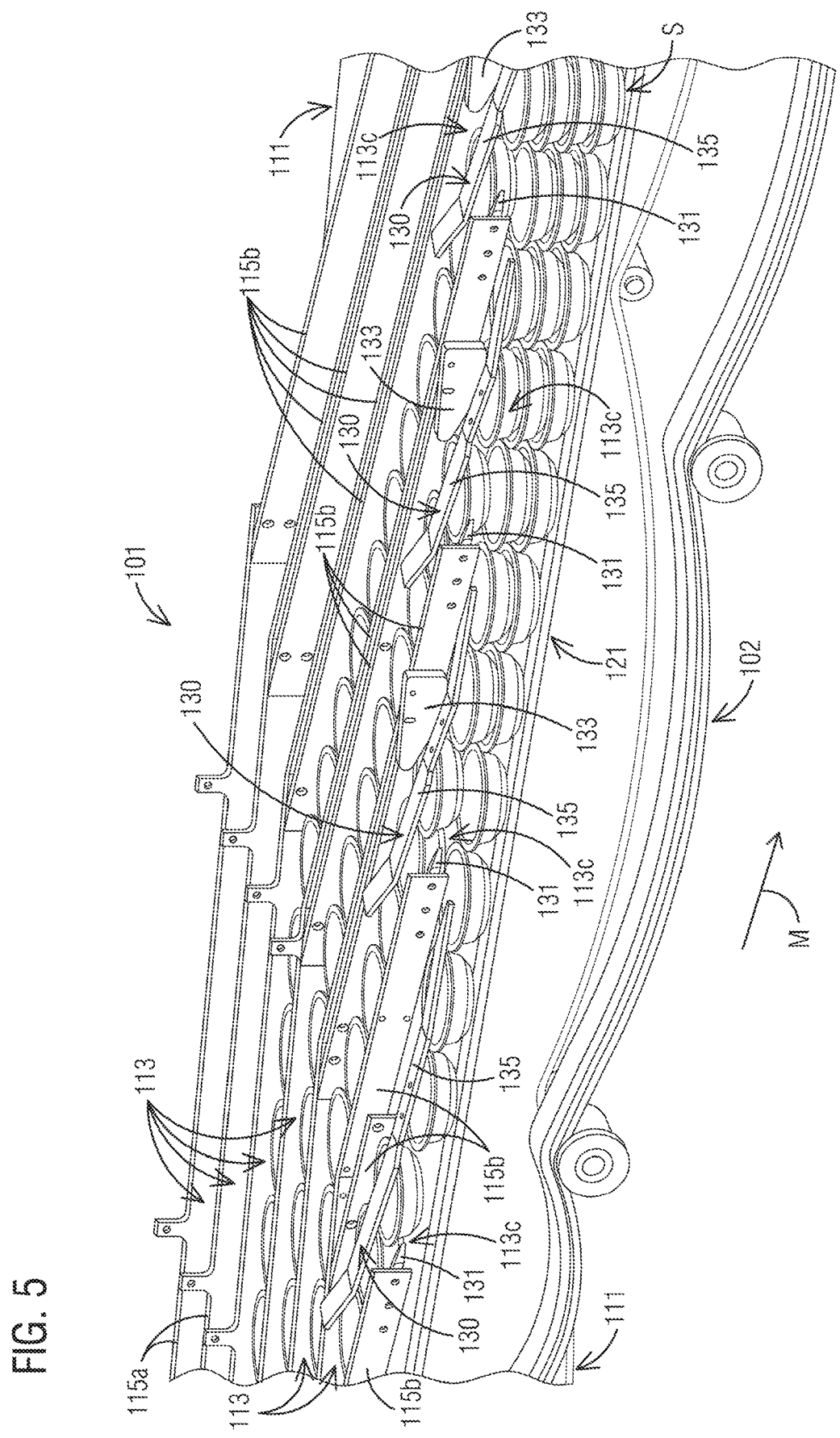
FIGS. 5 and 6 are schematic perspective views of portions of an article conveyor assembly of the system of FIG. 1 according to the exemplary embodiment of the disclosure.
Figure 6:
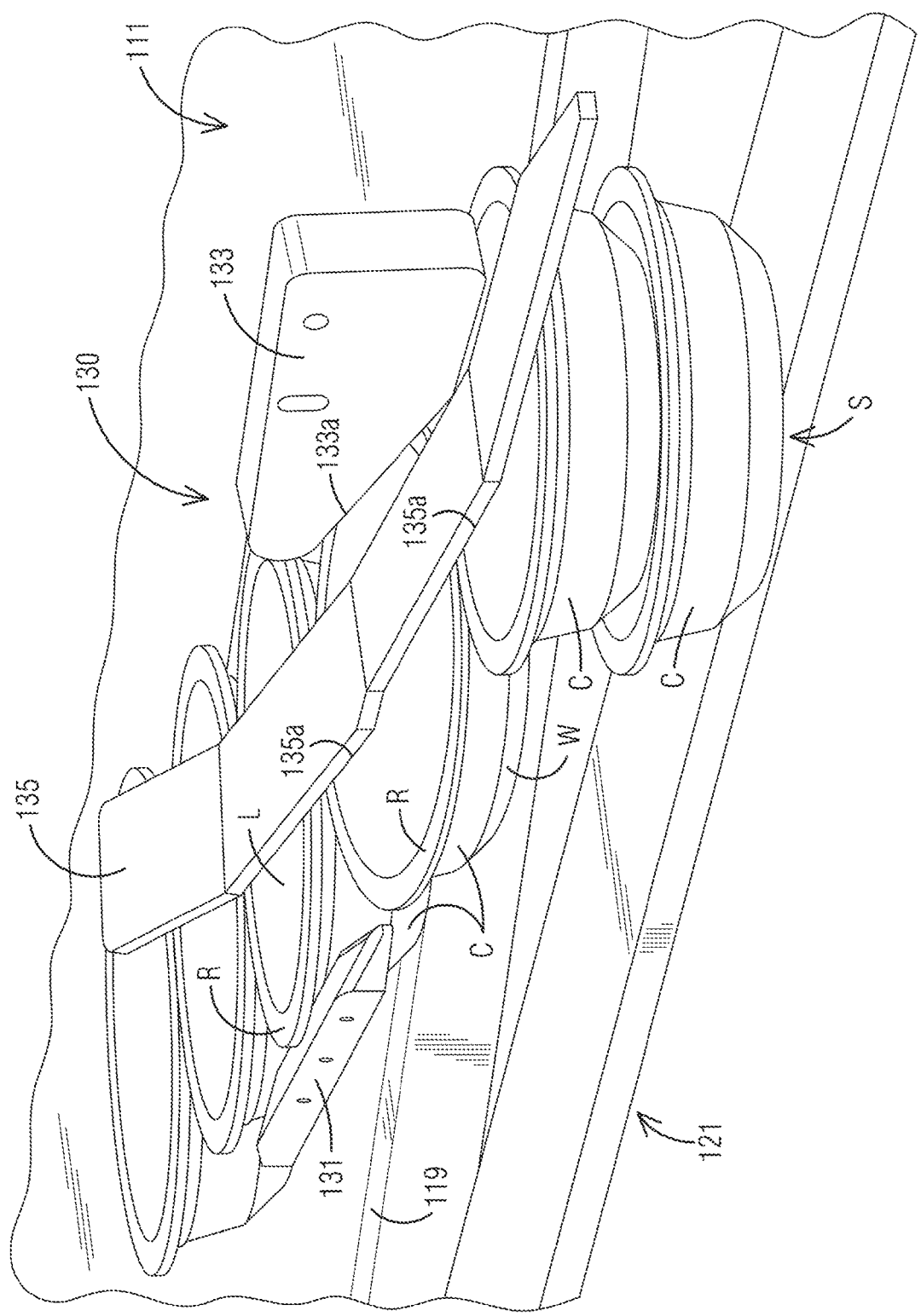

In the illustrated embodiment, the product guides 115 extend outwardly over the stacking conveyor 121 at the output ends 113c of the lanes 113 to help guide the articles C onto the stacking conveyor 121. As shown in FIGS. 5 and 6, the article conveyor assembly 101 can include additional guide features 130 that can be positioned at the output ends 113c of the lanes 113 for guiding the articles C onto the stacking conveyor 121 in the stacks S. In one embodiment, the guide features can help keep the articles C from tipping in the transverse direction T as they move off the article conveyor 111 to the stacking conveyor 121 and/or onto a previously-placed article C. In the illustrated embodiment, the guide features can include a rim guide 131 mounted to at least one of the downstream product guides 115b at each output end 113c for engaging under the rims R of the articles C (e.g., to help prevent the articles C from tipping onto the stacking conveyor 121). For example, the rim guide 131 can engage the rims R of the articles C on a side of the article that extends beyond the transition edge 119 of the article conveyor 111, over the stacking conveyor 121 at least while an opposing portion of the article C is supported by the article conveyor 111. Additionally, a stacker lane bump 133 can be mounted to at least one of the downstream product guides 115b opposite to the rim guide 131 at each output end 113c. As shown in FIG. 3, each of the stacker lane bumps 133 can be mounted to a portion of the respective downstream product guide 115b that extends in the machine direction M so that the length of each stacker lane bump 133 also extends along the machine direction M. The stacker lane bumps 133 can have an inclined surface 133a (FIG. 6) for engaging the tops of the articles C, which can help keep the articles C from tipping in the transverse direction T when they are partially supported by the article conveyor 111 until the article C is supported by the stacking conveyor 121 and/or a lower, previously-placed article in the stack S. In one embodiment, the rim guide 131 and/or the stacker lane bump 133 can be made from nylon or another suitable plastic or any other suitable material.

In the illustrated embodiment, the guide features further can include top guides 135 mounted to the cross bars 116 (FIG. 1) above the articles C at the output ends of the lanes 113. As shown in FIG. 3, the top guides 135 can include an upstream section that extends in the oblique direction OB along the downstream portion 113b of the respective lanes 113 and a downstream section that extends in the machine direction M over the stacking conveyor 121. As shown in at least FIGS. 5 and 6, the top guides 135 can include sloped portions 135a for gradually engaging and guiding the articles C from the lanes 113 to the sloped stacking conveyor 121. In an exemplary embodiment, the sloped surfaces 133a, 135a of the respective stacker lane bumps 133 and top guides 135 can cause the downstream portion of each article C to pivot downwardly and/or the upstream portion of each article C to pivot upwardly along the sloped surfaces 133a, 135a as the articles C move past the stacker lane bumps 133 and the top guides 135 at the output ends 113c of the lanes 113 onto the stacks S and/or the stacking conveyor 121. As shown in FIGS. 1, 3, and 5, the guide features 130 similarly or identically arranged at each output end 113c of each lane 113 except that the farthest upstream output end 113c does not include a stacker lane bump 133 in one embodiment. In other embodiments, the guide features 130 can have the same arrangement (e.g., with a rim guide 131, a stacker lane bump 133, and a top guide 135) at each of the output ends 113c or the output ends 113c could have different arrangements of the guide features 130. Any of the guide features 130 including at least the rim guides 131, the stacker lane bumps 133, and/or the top guides 135 could be omitted or could be otherwise shaped, positioned, arranged, and/or configured without departing from the disclosure.

Figure 7A:
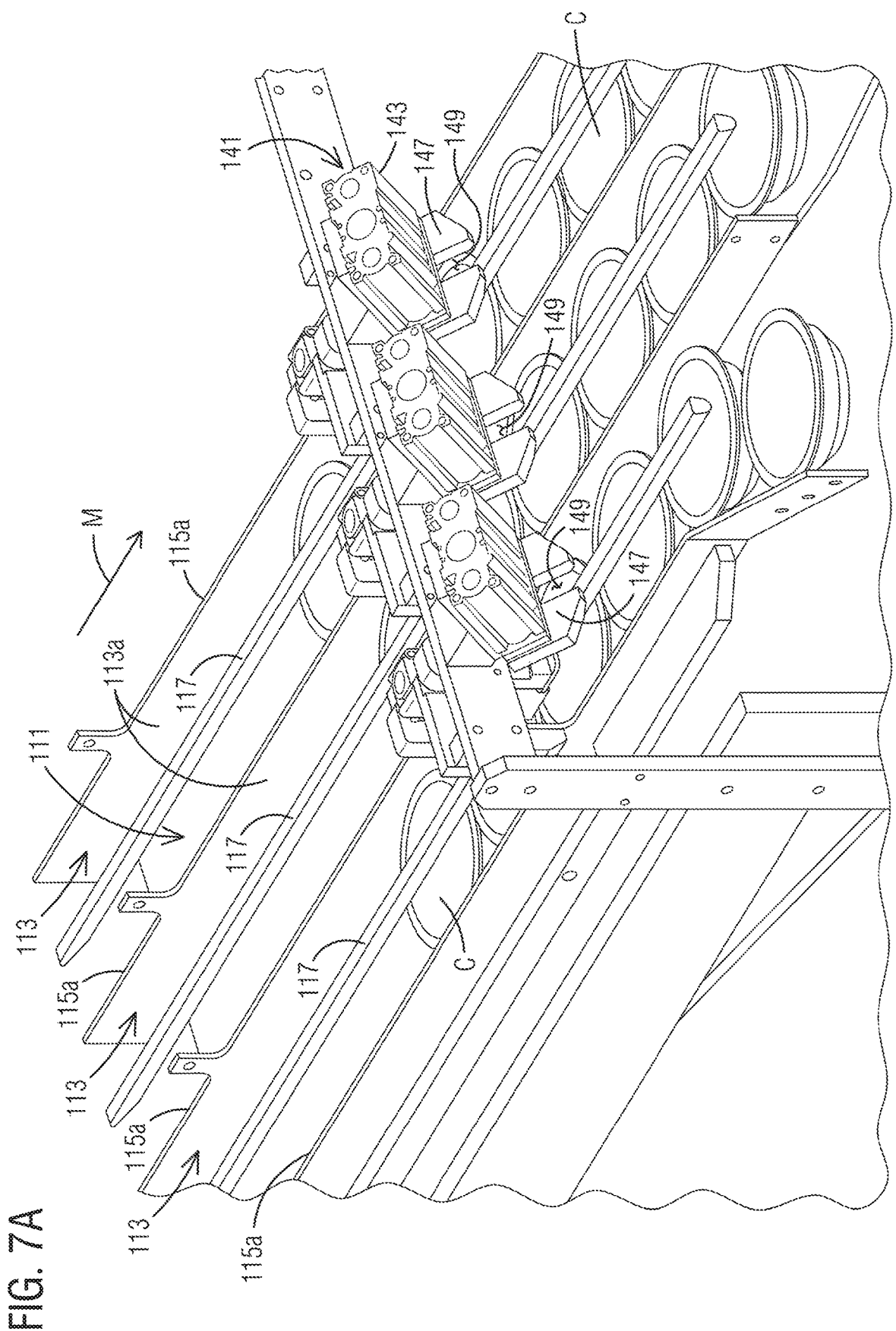
FIGS. 7A and 7B are schematic views of an article gate assembly of the article conveyor assembly according to the exemplary embodiment of the disclosure.
Figure 7B:
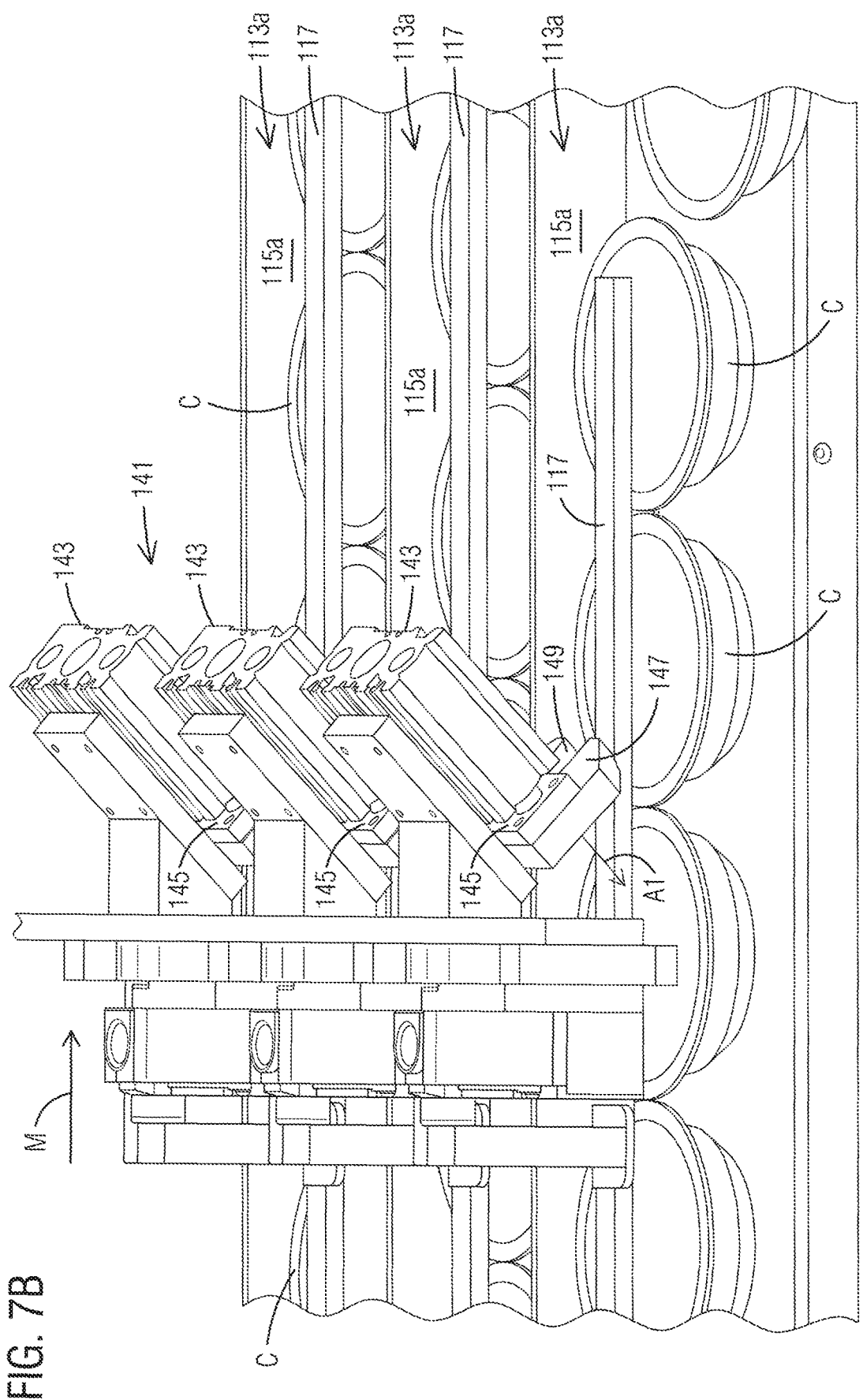

As shown in FIGS. 7A, and 7B, the article conveyor assembly 101 also can include product gates 141 that can help to stop the articles C in the lanes 113. In one embodiment, the product gates 141 can include a piston body 143 (e.g., for a pneumatic actuator, hydraulic actuator, or any other suitable actuator) mounted on one or more of the cross bars 116, a piston 145 that is movable in the piston body 143, and an article stop plate 147 mounted to the piston 145 associated with each lane 113. When actuated, the pistons 145 can move with respect to the piston bodies 143 to move the article stop plates 147 at least downwardly (e.g., in the direction of arrow A1 in FIG. 7B) into the respective lanes 113 to block the articles C from progressing on the article conveyors 111. The pistons 145 can be retracted at least partially into the piston bodies 143 to move the article stop plates 147 out of the lanes 113 to allow the articles C to be moved in the lanes 113 by the article conveyors 111. In one embodiment, each of the article stop plates 147 can include a cutout 149 to accommodate the hold down rails 117 when the article stop plates are moved into the lanes 113. Any portion of the product gates 141 could be omitted or could be otherwise shaped, positioned, arranged, and/or configured without departing from the disclosure.

Figure 4:
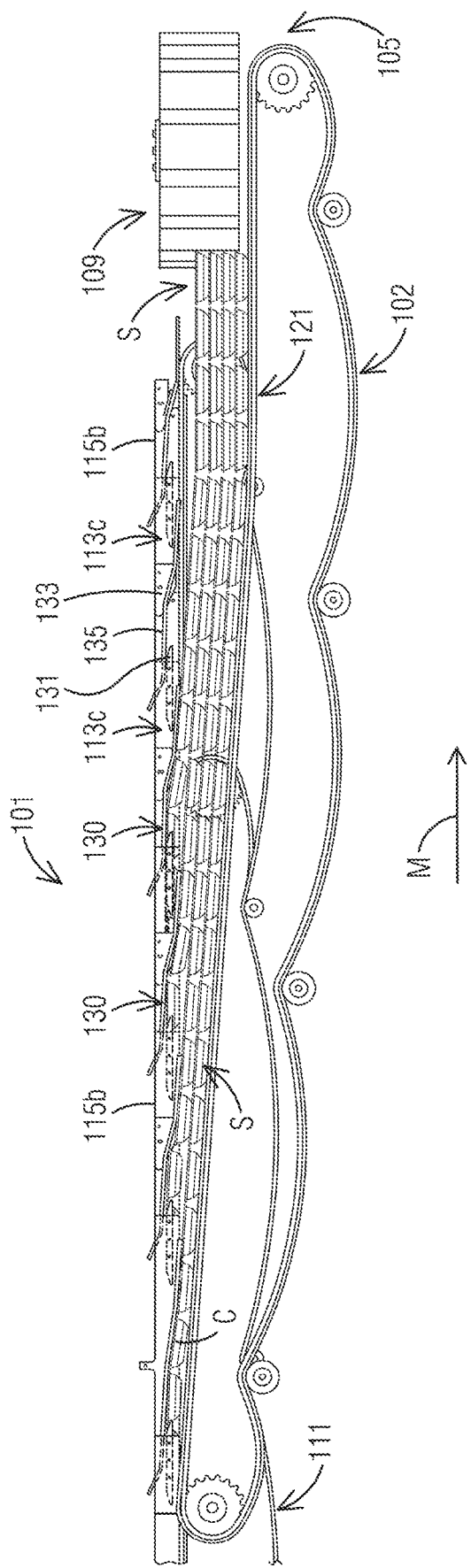
FIG. 4 is a schematic elevation view of a stacking conveyor assembly and other portions of the system of FIG. 1.

As shown in FIGS. 1, 3, and 4, the stacking conveyor assembly 102 can include the stacking conveyor 121 (e.g., a motor-driven endless conveyor) extending along the article conveyor assembly 101 adjacent the output ends 113c of the lanes 113. In an exemplary embodiment, the stacking conveyor 121 can be configured to move the articles C in the machine direction M at the same rate or at approximately the same rate that the article conveyors 111 move the articles C. In the illustrated embodiment, the stacking conveyor 121 can be sloped so that the articles C can be stacked on top of one another (to form the stacks S) as the stacking conveyor 121 moves the articles C received from the lanes 113 past subsequent output ends 113c. In one embodiment, the stacking conveyor 121 can move the articles C in the machine direction M and downwardly so that each article C is moved downwardly by a distance that is equal to or greater than the height of the articles C by the time the article C passes the output end 113c of the next lane 113 so that the next article C can move onto the top of the article C (e.g., as shown in FIGS. 4-6). The stacking conveyor 121 can continue to move the stacks S to the downstream end 105 and the star wheel assembly 109. Any portion of the stacking conveyor assembly 102 could be omitted or could be otherwise shaped, positioned, arranged, and/or configured without departing from the disclosure.

Figure 9:
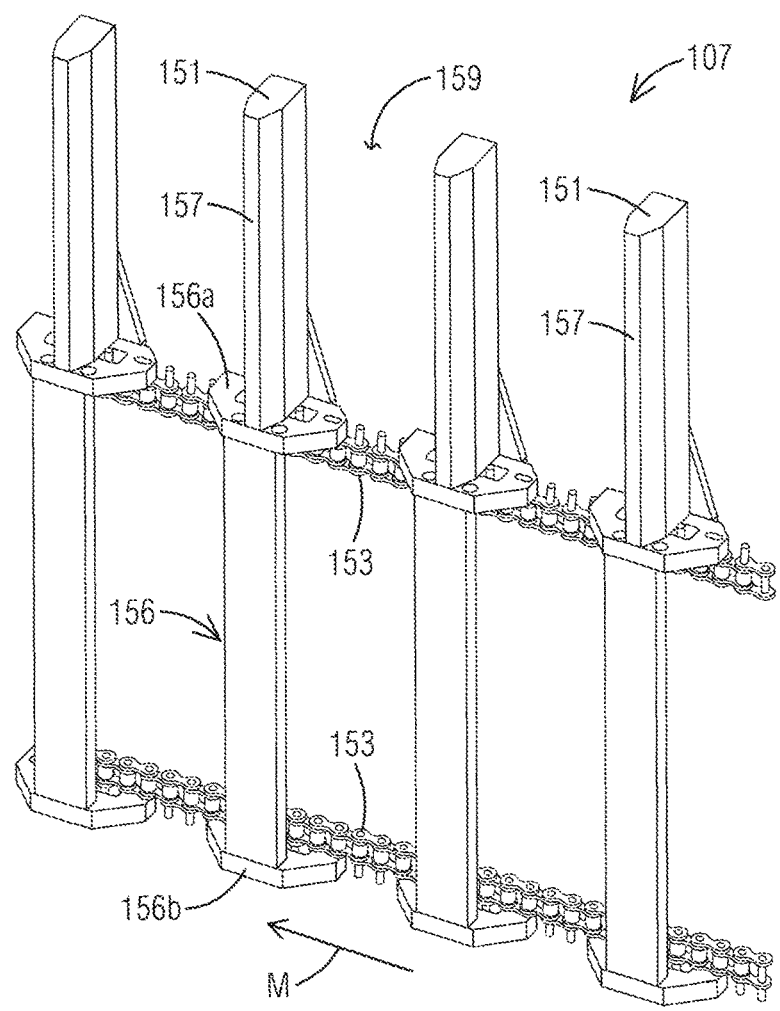
FIG. 9 is a schematic perspective view of a portion of the flight assembly of FIG. 8.

As shown in FIGS. 1, 3, and 8-10, the flight assembly 107 can include a plurality of flights 151 mounted in spaced relation to one another on two vertically spaced chains 153 arranged in a continuous loop. In the illustrated embodiment, the chains 153 are positioned in chain tracks 155 (e.g., FIGS. 1 and 8). In one embodiment, the flights 151 can be evenly spaced along the entire loop formed by the chains 153. However, a number of the flights 151 are omitted for clarity in the figures. As shown in FIG. 9, each of the flights can include a bracket 156 with a top plate 156*a* engaging the top chain 153 and a bottom plate 156*b* engaging the bottom chain 153 so that the bracket 156 supports the flight 151 on the two chains 153.

Figure 10:
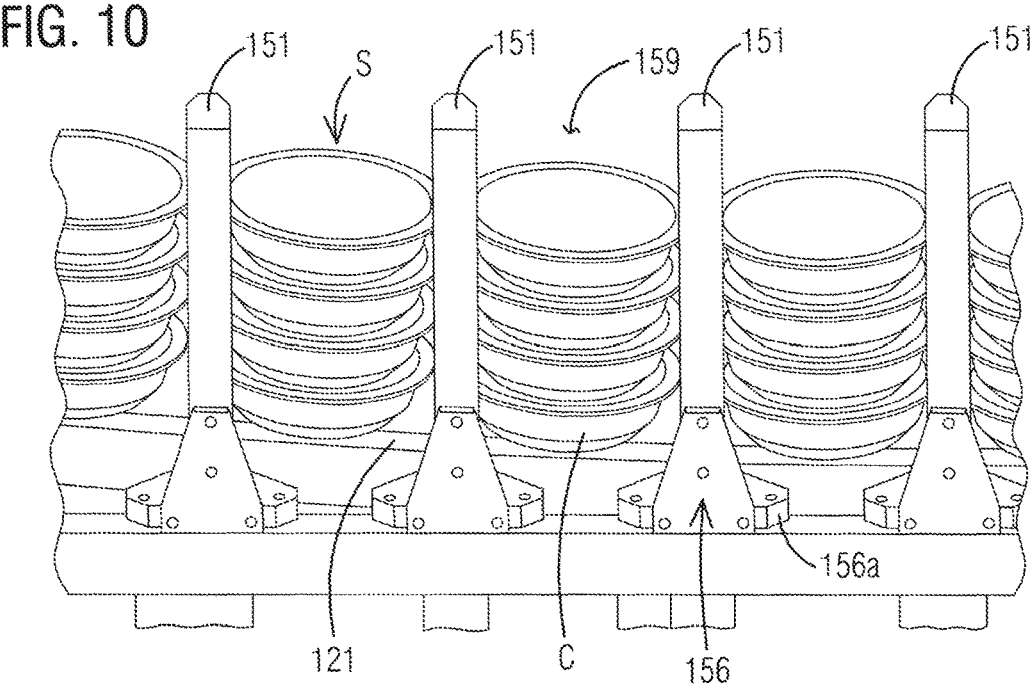
FIG. 10 is a schematic perspective view of a portion of the flight assembly of FIG. 8 and the stacking conveyor assembly of FIG. 4 according to the exemplary embodiment of the disclosure.

In the illustrated embodiment, each of the flights 151 can include a wedge-shaped or curved portion 157 (FIGS. 8-10) that can extend between the stacks S as the stacks S are formed on the stacking conveyor 121 (FIGS. 3 and 10). For example, each pair of adjacent flights 151 can form a receiving space 159 between the flights for the stacks S (FIG. 10). As shown in FIGS. 1 and 3, the chains 153 can move the flights 151 in the machine direction M along the stacking conveyor 121, and each of the articles C can be received in the receiving spaces 159 as the articles are stacked on the stacking conveyor 121. In one embodiment, the wedge portions 147 of each flight 151 can extend between two adjacent stacks S as the stacking conveyor 121 and the flights 151 move the stacks S in the machine direction M. The flights 151 can be moved away from the stacking conveyor 121 on the chains 153 proximate the downstream end 105 and can be moved toward the upstream end 103 on the chains 153 in the continuous loop. Any portion of the flight assembly 107 could be omitted or could be otherwise shaped, positioned, arranged, and/or configured without departing from the disclosure.

As shown in FIGS. 1, 3, and 4, the star wheel assembly 109 can include a star wheel 161 mounted at the downstream end 105 of the system 100. In the illustrated embodiment, the star wheel 161 can be rotated by an electric motor or other suitable actuator. In an exemplary embodiment, the star wheel 161 can be rotated in a counterclockwise direction as viewed in FIGS. 1 and 3 so that the portion of the star wheel 161 moving over the stacking conveyor 121 is moving generally in the machine direction M. In one embodiment, the star wheel 161 can include recesses 163 for receiving the respective stacks S moving in the machine direction M on the stacking conveyor 121 and guiding the stacks S off of the stacking conveyor (e.g., onto another conveyor or to be received by the system 300). Any portion of the star wheel assembly 109 could be omitted or could be otherwise shaped, positioned, arranged, and/or configured without departing from the disclosure.

In operation, the articles C can be loaded onto the article conveyors 111 in the lanes 113 (e.g., from another conveyor or a loading system). In the illustrated embodiment, the articles C are loaded into four of the six lanes 113 so that the system 100 forms stacks S having four articles C each. In other embodiments, any number of the lanes 113 can include articles C for forming stacks S with a corresponding number of articles C. In the illustrated embodiment, the article conveyors 111 move in the machine direction M under the lanes 113 in order to move (e.g., carry) the articles C in the machine direction M in the upstream portions 113*a* of the lanes 113. The upstream product guides 115*a* and the top rails 117 can guide the articles C and help retain the articles C in the lanes 113 as the articles C move in the machine direction M on the article conveyors 111. In each lane 113, the articles C move from the upstream portion 113*a* to the downstream portion 113*b* in which the article conveyors 111 continue to urge the articles C in the machine direction M while the downstream product guides 115*b* direct the articles C in the oblique direction OB so that the articles C move toward the output ends 113*c* of the respective lanes 113. As shown in FIG. 5, the guide features 130 at the output end 113*c* of the lane 113 closest to the stacking conveyor 121 (e.g. with the output end 113*c* that is farthest upstream) guide the articles C as they move off the transition edge 119 and onto the stacking conveyor 121. The rim guide 131 engages under the rim R of the articles C at this upstream output end 113*c* to help support the articles C and to help prevent the articles C from tipping in the transverse direction T as the downstream product guides 115*b* urge the article C off the article conveyor 111. In addition, the top guide 135 at the upstream output end 113*c* also can help prevent tipping of the articles C in the transverse direction T as they transition to the stacking conveyor 121. In one embodiment, the top guide 135 can urge the articles C downwardly (e.g., along the sloped portions 135*a*) as they transition to the stacking conveyor 121. The downstream end of the top guide 135 can help hold the articles C in position on the stacking conveyor 121 as the stacking conveyor 121 moves the articles C in the machine direction M towards the next output end 113*c*.

As shown in FIGS. 5 and 6, the guide features 130 at each subsequent output end 113*c* can guide the articles C onto the previously-placed articles on the stacking conveyor 121 in a similar or identical manner with the rim guides 131, the stacker lane bumps 133, and the top guides 135 engaging the articles C. As each article C begins to move off of the transition edge 119 of the article conveyor 111 as the article moves in the oblique direction OB, the rim guide 131 can engage under the rim R of the article (FIG. 6) to help hold up the side of the article that is no longer supported by the article conveyor 111 at the transition edge 119. As the article C continues to move off the article conveyor 111 over the previously-placed article C on the stacking conveyor 121, the top guide 135 and the stacker lane bump 133 can extend over at least a portion of the article C. The article C in the output end 113*c* engages the top guide 135 and the inclined surface 133*a* of the stacker lane bump 133, which can help keep the article C from tipping sideways off the transition edge 119. In one embodiment, the stacker lane bump 133 can engage a portion (e.g., a proximal portion) of the article C that is still over the article conveyor 111 or just moving off the article conveyor 111 while an opposing portion (e.g., distal portion) of the article C extends beyond the transition edge 119 of the article conveyor 111 to help prevent sideways tipping of the article C. The inclined surface 133*a* of the stacker lane bump 133 and the sloped portions 135*a* of the top guide 135 can guide the article C downwardly onto the previously-placed article C as the article C moves off the article conveyor 111 onto the stack S. The article conveyor 121 can continue to move the stacked articles C in the machine direction M as articles C are guided onto the stacks S from subsequent output ends 113*c* for each lane 113 with articles C.

As shown in at least FIGS. 1, 3, and 10, the flights 151 of the flight assembly 107 further can help retain the articles C in the stacks S as the stacks S move in the machine direction on the stacking conveyor 121. In one embodiment, the flight assembly 107 can move the flights 151 on the chains 153 in the machine direction M at the same rate as the stacking conveyor 121, and the wedge-shaped portions 157 of each of the flights 151 can extend between two stacks S and/or can engage one or more articles C in each of two adjacent stacks S as the stacks S and the flights 151 move in the machine direction M. Accordingly, each stack S is at least partially received in a respective receiving space 159 defined between two flights 151. As the stacks S and the flights 151 approach the star wheel assembly 109, the flights 151 move away from the stacking conveyor 121 and the stacks S, around the downstream end of the flight assembly 107 to be returned to the upstream end of the flight assembly. The stacks S can then be engaged in a respective recess 163 of the star wheel 161, which can then push the stack S off the stacking conveyor 121 as the star wheel 161 rotates. The articles C could be otherwise moved through the system 100 and/or the stacks S could be otherwise formed without departing from the disclosure.

Figure 11:
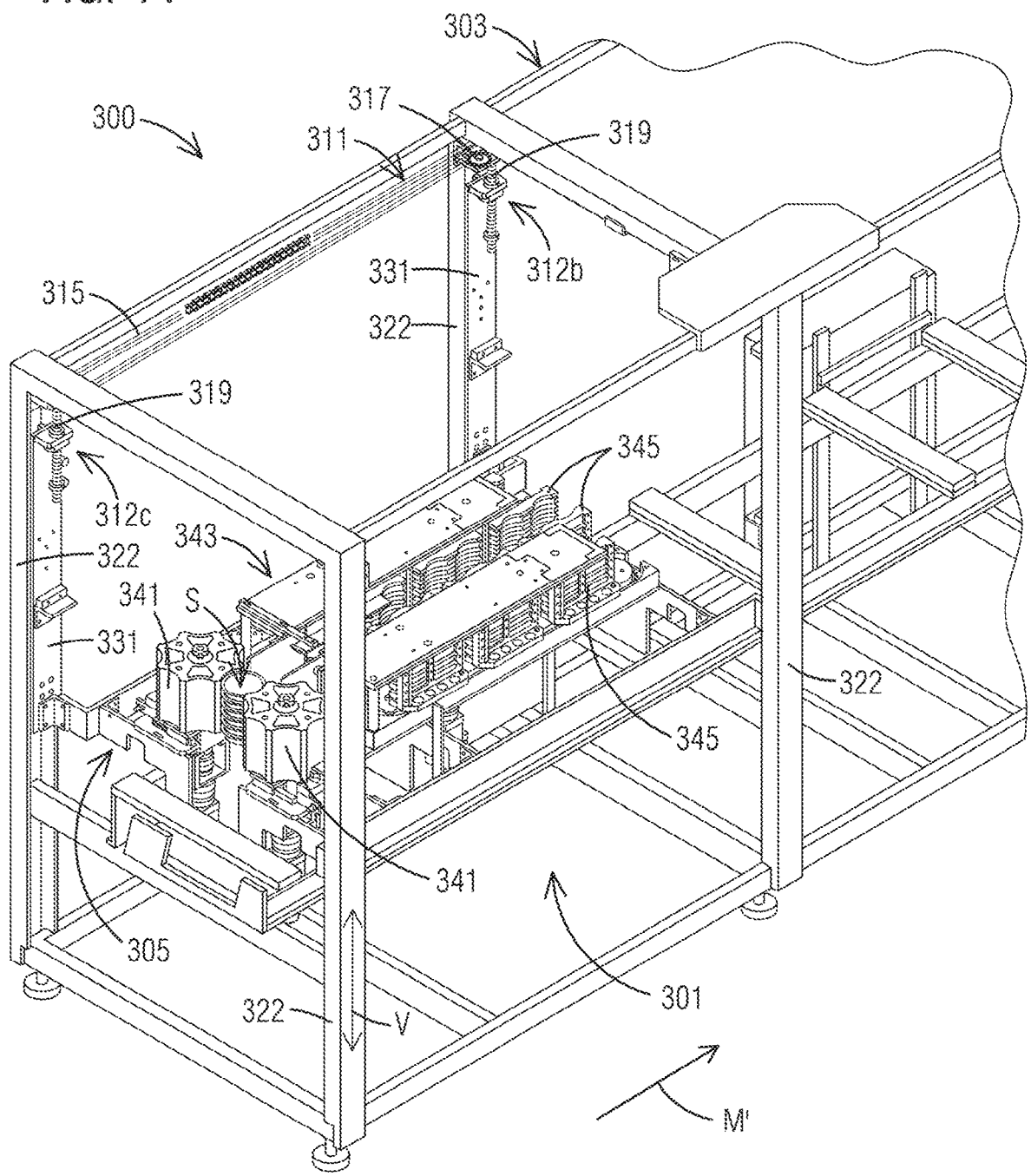
FIG. 11 is a schematic perspective view of an article loading system according to the exemplary embodiment of the disclosure.

As shown in FIGS. 11-15, the article loading system 300 can include a receiving assembly 301 mounted to an outer frame 303. In the illustrated embodiment, the receiving assembly 301 can include a movable frame 305 coupled to a height adjustment apparatus 311 for moving the movable frame 305 up and down relative to the outer frame 303. As shown in FIG. 11, the receiving assembly 301 can be mounted to the outer frame 301 via the height adjustment apparatus 311 so that at least the movable frame 305 of the receiving assembly 301 can be adjusted vertically (e.g., in the direction V; FIG. 11) to accommodate different sized stacks S and/or different sized articles C to properly position the stacks S for packaging in a packaging system (not shown), which can also be mounted in the frame 303 or can be positioned adjacent the frame 303, for example. In one embodiment, the packaging system can be a Marksman packaging system available from Graphic Packaging International, LLC, of Atlanta, Ga., or a similar packaging system, or any other suitable packaging system.

Figure 13:
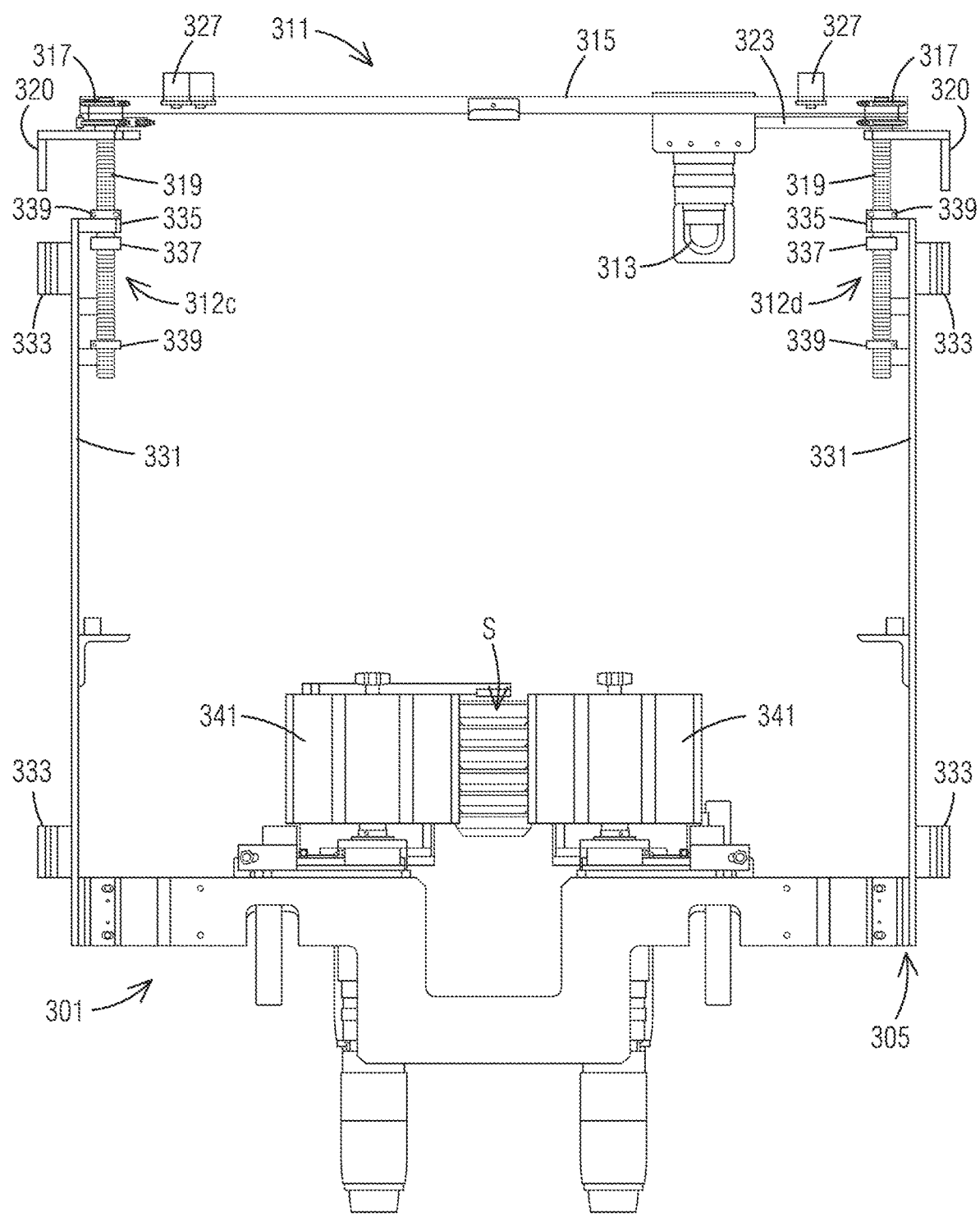
Figure 14:
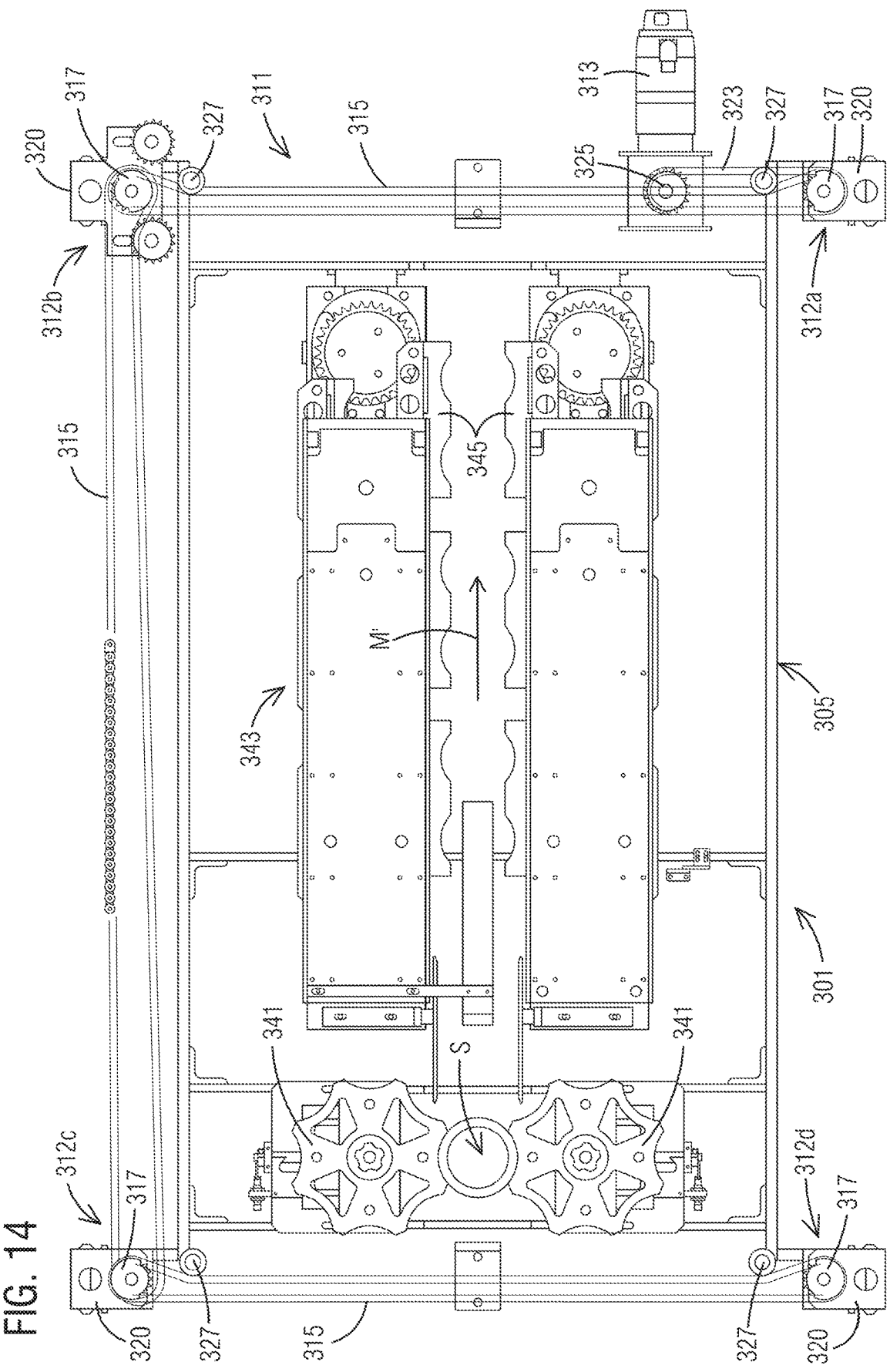
Figure 15:
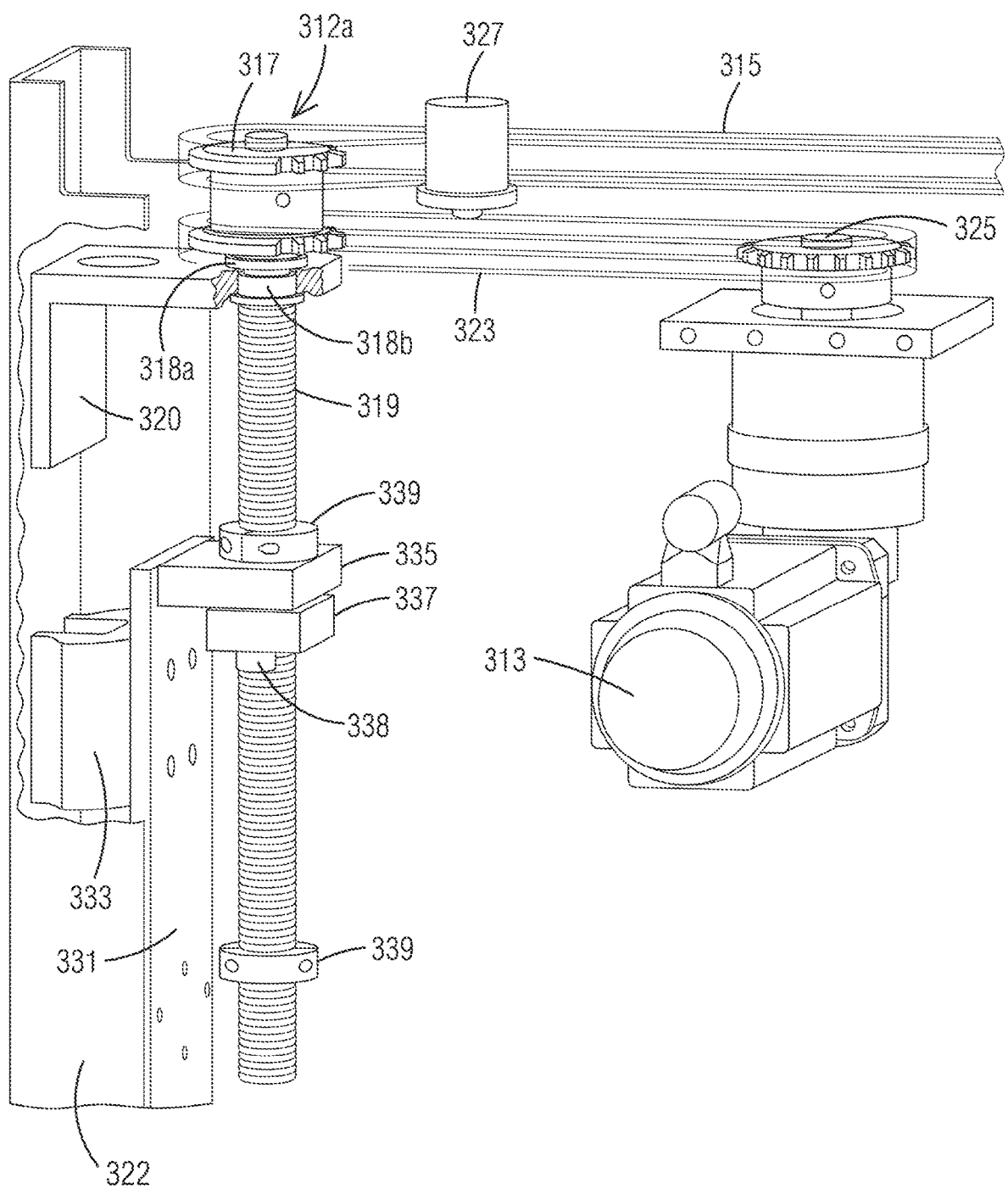
FIG. 15 is a schematic perspective view of a lift assembly and other portions of the receiving assembly of FIGS. 11-14 according to the exemplary embodiment of the disclosure.

As shown in FIGS. 11-15, the height adjustment apparatus 311 can include four lift assemblies 312a, 312b, 312c, 312d, each mounted to the outer frame 303 at a respective corner of the receiving assembly 301. As shown in FIGS. 12-15, each of the lift assemblies 312a, 312b, 312c, 312d can include a wheel or gear 317, a power screw 319 (e.g., a screw having an Acme thread form or other suitable thread forms), and a mounting bracket 320. In the illustrated embodiment, each of the wheels 317 can be coupled to the power screw 319 so that turning the wheel 317 turns the power screw 319, and the power screw 319 can be coupled to the mounting bracket 320 via a bushing, a bearing, and/or another suitable feature so that the mounting bracket supports the power screw 319 while allowing the power screw 319 to turn with respect to the mounting bracket 320. For example, as shown in the breakaway portion of the mounting bracket 320 in FIG. 15, the power screw 319 can be supported on the mounting bracket 320 by a thrust bearing 318a and a bushing 318b (FIG. 15). In one embodiment, the thrust bearing 318a can be supported on the upper surface of the mounting bracket 320 and can engage a portion of the power screw 319 that extends through the opening in the mounting bracket 320. The bushing 318b can be positioned between the power screw 319 and the opening in the mounting bracket 320. Also as shown in FIG. 15, the mounting brackets 320 can be mounted to an upright 322 of the outer frame 303, wherein a portion of the upright 322 is broken away to show the mounting bracket 320 mounted to an internal portion of the upright 322.

As shown in FIGS. 14 and 15, the wheel 317 of the lift assembly 312a engages a drive chain 323, which is driven by a servo motor 313 or other suitable actuator via a drive wheel 325. In the illustrated embodiment, the four wheels 317 of the lift assemblies 312a, 312b, 312c, 312d are coupled together via three chains 315 so that the wheels 327 all turn at the same rate and in the same direction when the wheel 317 of the lift assembly 312a is turned by the motor 313 via the drive chain 323. In one embodiment, a plurality of tensioner wheels 327 can be adjustably mounted to the outer frame 303 for applying tension to the chains 315 (e.g., to take up slack in the chains 315). Any portion of the height adjustment apparatus 311 could be omitted or could be otherwise shaped, positioned, arranged, and/or configured without departing from the disclosure.

Figure 12:
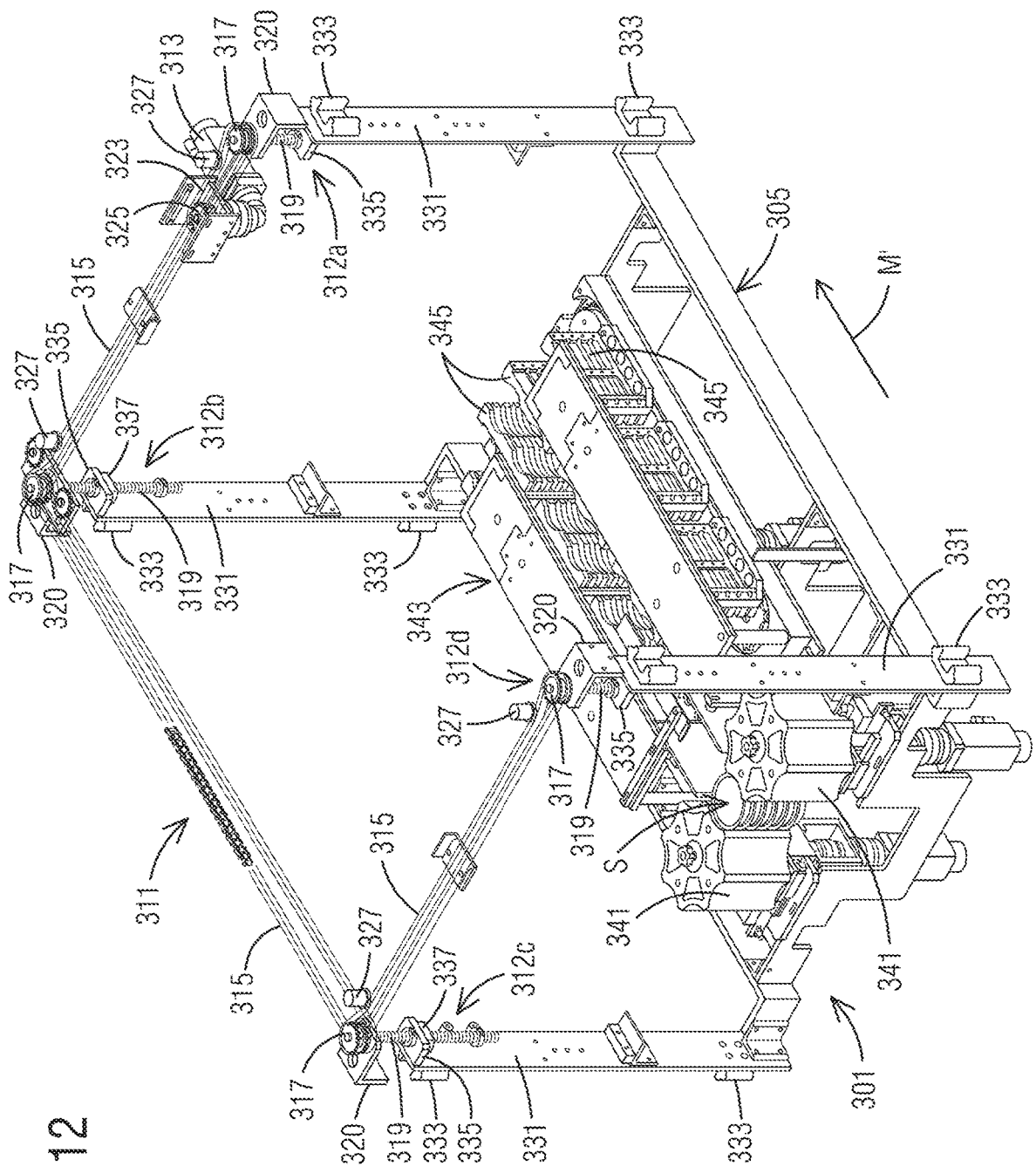
FIGS. 12-14 are schematic views of a receiving assembly of the article loading system of FIG. 11 according to the exemplary embodiment of the disclosure.

As shown in FIG. 12, the movable frame 305 can support conveyor features of the receiving assembly 301 and can include four vertical supports 331 extending along each of the uprights 322 of the outer frame 303. In one embodiment, each of the uprights 322 can be U-shaped and can at least partially receive the respective vertical supports 331 between the sidewalls of the upright. Each of the vertical supports 331 can be mounted to two lift guides 333, which can be received between the sidewalls of the uprights 322 (FIG. 15) to help retain the vertical supports 331 in the vertical orientation (e.g., to restrain the vertical supports 331 from movement that is transverse to the upright 322 and the vertical direction V). For example, the breakaway portion of the upright 322 in FIG. 15 shows one of the lift guides 333 received in the interior of the upright 322. As shown in FIGS. 12 and 15, a mounting plate 335 can be mounted at a top end of each of the vertical supports 331 and can receive the power screw 319 of the respective lift assembly 312a, 312b, 312c, 312d though a clearance hole, and a nut 337 (e.g., a nut with an Acme thread form or other suitable thread form for engaging the power screw 319) can be mounted to each of the mounting plates 335 (e.g., via bolts or other fasteners 338; FIG. 15). In the illustrated embodiment, the nuts 337 can be in threaded engagement with the respective power screws 319 so that the vertical mounts 331 are supported by and suspended from the respective power screws 319 via the respective mounting plates 335 and nuts 337. As shown in FIGS. 12, 13, and 15, the vertical travel of the vertical supports 331 on the power screws 319 can be limited by two collars 339 mounted on the power screw 319 above and below the mounting plate 335 and the nut 337. Any portion of the movable frame 305 could be omitted or could be otherwise shaped, positioned, arranged, and/or configured without departing from the disclosure.

In the illustrated embodiment, the conveyor features of the receiving assembly 301 can include two star wheels 341 mounted on the movable frame 305 at an upstream end of the system 300 for receiving the stacks S from the system 100 (e.g., from the star wheel 161). The star wheels 341 can rotate to move the respective stacks S in the machine direction M' to a gripper conveyor 343 supported on the movable frame 305. In one embodiment, the gripper conveyor 343 can include gripper plates 345 moving on two opposed cam tracks on either side of the stacks S. In one embodiment, the gripper plates 345 can be configured to grip the stacks S between two gripper plates 345 and move in the machine direction M' on the cam tracks to move the stacks S in the machine direction M' to the packaging system. Accordingly, the star wheels 341 and the gripper conveyor 343 can cooperate to receive the stacks S of articles C and convey the stacks S to the packaging system. Any portion of the star wheels 341 and/or the gripper conveyor 343 could be otherwise shaped, positioned, arranged, and/or configured without departing from the disclosure. For example, any suitable conveyor can be supported on the movable frame 305 for moving the stacks S through the receiving assembly 301 to the packaging system.

In operation, the movable frame 305 can be moved in the vertical direction V by actuating the motor 313 to turn the drive wheel 325, which moves the drive chain 323, which turns the wheel 317 of the lift assembly 312a. Since the four wheels 317 are rotationally coupled by the chains 315, all four wheels 317 rotate in the same direction at the same rate while the motor 313 is actuated. In the illustrated embodiment, the wheels 317 turn the respective power screws 319 to cause the respective nuts 337 to travel along the threads of the respective power screw 319 either upwardly or downwardly depending on the rotation direction of the power screws 319. Since the movable frame 305 is suspended from the nuts 337 via the mounting plates 335 and the vertical supports 331, the movable frame 305 moves vertically on the power screws 319 relative to the outer frame 303. In the illustrated embodiment, the lift guides 333 can slide along the uprights 322 as the vertical supports 322 move vertically.

In the illustrated embodiment, the receiving assembly 301 can be configured to receive stacks S of articles C of different heights (e.g., stacks S having 2 to 6 articles C or any suitable number of articles C). The height adjustment apparatus 311 can be operated to move the movable frame 305 vertically so that the stacks S are received between the gripper plates 345 of the gripper conveyor 343 at an appropriate height so that the articles C in the stacks S are aligned with the packaging system. For example, the conveyor features can be aligned with the stacks S so that the top-most or the bottom-most article C is moved through the gripper conveyor 343 at a predetermined height relative to the outer frame 303 and/or the features of the packaging system, wherein the predetermined height is the same regardless of the number of articles C in the stacks S. Accordingly, the receiving assembly 301 can pass the stacks S to the packaging machine at an alignment that is appropriate for the features of the packaging system, which can help reduce or eliminate complicated adjustments the packaging system that may otherwise be needed to account for stacks having different numbers of articles C.

Subsequently, in one embodiment, a packaging system can receive the stacks S from the gripper conveyor 343 and load the stacks into cartons (not shown) (e.g., the cartons can be wrapped around the stacks S). In an exemplary embodiment, any suitable number of stacks S can be loaded into a carton (e.g., in a 1×1, a 2×1, a 2×2, a 5×1, a 1×3, etc. configuration).

The foregoing description of the disclosure illustrates and describes various embodiments. As various changes could be made in the above construction without departing from the scope of the disclosure, it is intended that all matter contained in the above description or shown in the accompanying drawings shall be interpreted as illustrative and not in a limiting sense. Furthermore, the scope of the present disclosure covers various modifications, combinations, alterations, etc., of the above-described embodiments. Additionally, the disclosure shows and describes only selected embodiments, but various other combinations, modifications, and environments are within the scope of the disclosure as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A method of arranging articles, the method comprising:
    moving a first article and a second article on an article conveyor along a respective first lane and second lane toward a respective first output end of the first lane and second output end of the second lane;
    guiding the first article from the first output end of the first lane onto a stacking conveyor extending along the article conveyor, the guiding the first article comprising engaging the first article with first output end guides;
    moving the first article on the stacking conveyor past the second output end of the second lane;
    forming a stack by guiding the second article from the second output end of the second lane onto the first article on the stacking conveyor as the stacking conveyor moves the first article past the second output end, the guiding the second article comprising engaging the second article with second output end guides; and
    moving the stack on the stacking conveyor.

2. The method of claim 1, wherein the first article and the second article are at least partially moved in the respective first lane and second lane of the article conveyor, the stacking conveyor extends along a transition edge of the article conveyor, and the first output end guides and the second output end guides guide the respective first article and second article as they move past the transition edge of the article conveyor.

3. The method of claim 2, wherein the first output end guides and the second output end guides comprise a respective first top guide and second top guide, each extending over a portion of the article conveyor and a portion of the stacking conveyor at the respective first output end and second output end, the guiding the first article comprises engaging the first article with the first top guide, and the guiding the second article comprises engaging the second article with the second top guide.

4. The method of claim 3, wherein the first output end guides and the second output end guides comprise a respective first rim guide and second rim guide, each mounted along a portion of the respective first output end and second output end, the guiding the first article comprises engaging under a first rim of the first article while at least an opposing portion of the first article is in engagement with the article conveyor, and the guiding the second article comprises engaging under a second rim of the second article while at least an opposing portion of the second article is in engagement with the article conveyor.

5. The method of claim 3, wherein at least the second output end guides comprise a stacker lane bump mounted at the second output end, and the guiding the second article comprises engaging a portion of the second article that is proximate to or in engagement with the article conveyor against the stacker lane bump while at least an opposing portion of the second article extends beyond the transition edge the article conveyor.

6. The method of claim 5, wherein the stacker lane bump comprises an inclined surface and the engaging a portion of the second article comprises engaging the second article with the inclined surface while at least a portion of the stacker lane bump extends above the second article.

7. The method of claim 1, wherein the stacking conveyor moves in a machine direction, the first lane is at least partially defined by a first product guide, the second lane is at least partially defined by a second product guide, each of the first product guide and the second product guide extending in an oblique direction with respect to the machine direction, the moving the first article and the second article in the respective first lane and second lane comprises moving the article conveyor in a machine direction to urge the first article and the second article in the machine direction while the first product guide and the second product guide direct the respective first article and second article along the oblique direction.

8. The method of claim 7, wherein at least the second output end guides comprise a stacker lane bump mounted to the second product guide at the second output end of the second lane, and the guiding the second article comprises engaging the second article with the stacker lane bump.

9. The method of claim 1, wherein the first output end guides and the second output end guides comprise a respective first top guide and second top guide, each extending over a portion of the respective first lane and second lane and a portion of the stacking conveyor, the guiding the first article comprises engaging the first article with the first top guide, and the guiding the second article comprises engaging the second article with the second top guide.

10. A system for arranging articles, the system comprising:
an article conveyor moving a first article in a first lane and a second article in a second lane, the first lane comprising a first output end with first output end guides and the second lane comprising a second output end with second output end guides;
a stacking conveyor extending along the article conveyor and moving past the first output end of the first lane and the second output end of the second lane, wherein the first output end guides guide the first article onto the stacking conveyor at the first output end of the first lane and the second output end guides guide the second article onto the first article at the second output end of the second lane.

11. The system of claim 10, wherein the stacking conveyor extends along a transition edge of the article conveyor, and the first output end guides and the second output end guides comprise a respective first top guide and second top guide, each extending over a portion of the article conveyor and a portion of the stacking conveyor at the respective first output end and second output end.

12. The system of claim 11, wherein the first output end guides and the second output end guides comprise a respective first rim guide and second rim guide, each mounted along a portion of the respective first output end and second output end, the first rim guide and the second rim guide engaging under a respective first rim and second rim of the respective first article and second article while at least an opposing portion of the respective first article and second article is in engagement with the article conveyor.

13. The system of claim 11, wherein at least the second output end guides comprise a stacker lane bump mounted at the second output end, the stacker lane bump engaging a portion of the second article that is proximate to or in engagement with the article conveyor while at least an opposing portion of the second article extends beyond the transition edge of the article conveyor.

14. The system of claim 10, wherein the article conveyor and the stacking conveyor each move along a machine direction, the first lane is at least partially defined by a first product guide, the second lane is at least partially defined by a second product guide, each of the first product guide and the second product guide extending in an oblique direction with respect to the machine direction for directing the respective first article and second article toward the stacking conveyor on the article conveyor.

15. The system of claim 14, wherein at least the second output end guides comprise a stacker lane bump mounted to the second product guide at the second output end of the second lane, the stacker lane bump engaging the second article to guide the second article at the second output end.

16. The system of claim 15, wherein the second output end guides further comprise a rim guide and a top guide mounted at the second output end of the second lane for engaging the second article at the second output end.

17. The system of claim 10, wherein the first output end guides and the second output end guides comprise a respective first top guide and second top guide, each extending over a portion of the article conveyor and a portion of the stacking conveyor at the respective first output end and second output end.

18. A method of arranging articles, the method comprising:
moving a first article and a second article along a respective first lane and second lane toward a respective first output end of the first lane and second output end of the second lane;
guiding the first article from the first output end of the first lane onto a stacking conveyor extending along the article conveyor, the guiding the first article comprising engaging the first article with at least one of a first top guide, a first stacker lane bump, and a first rim guide at the first output end;
moving the first article on the stacking conveyor past the second output end of the second lane;
forming a stack by guiding the second article from the second output end of the second lane onto the first article on the stacking conveyor as the stacking conveyor moves the first article past the second output end, the guiding the second article comprising engaging the second article with at least one of a second top guide, a second stacker lane bump, and a second rim guide at the second output end; and
moving the stack on the stacking conveyor.

19. A system for arranging articles, the system comprising:
an article conveyor moving a first article in a first lane and a second article in a second lane, the first lane comprising a first output end with at least one of a first top guide, a first stacker lane bump, and a first rim guide, and the second lane comprising a second output end with at least one of a second top guide, a second stacker lane bump, and a second rim guide;
a stacking conveyor extending along the article conveyor and moving past the first output end of the first lane and the second output end of the second lane, wherein the at least one of the first top guide, the first stacker lane bump, and the first rim guide guides the first article onto the stacking conveyor at the first output end of the first lane and the at least one of the second top guide, the second stacker lane bump, and the second rim guide guides the second article onto the first article at the second output end of the second lane.

* * * * *